March 11, 1952　　O. L. GARRETSON　　2,589,072
RELIEF VALVE
Filed Sept. 20, 1948
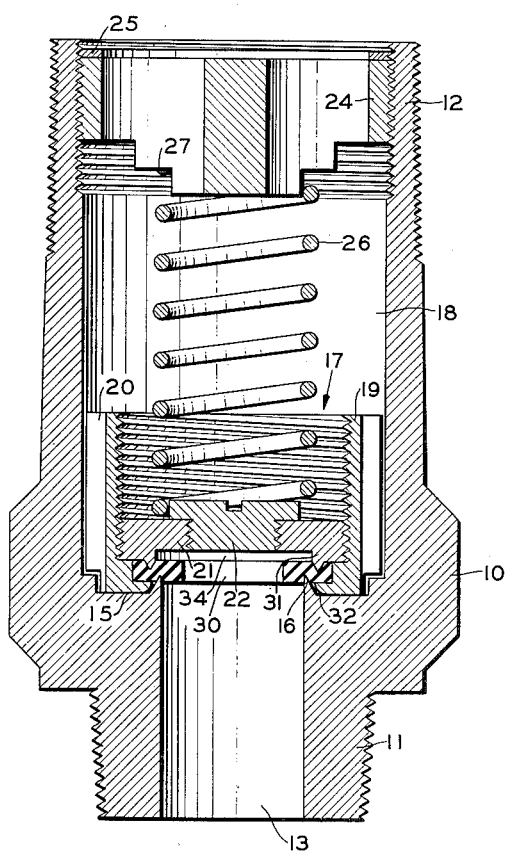
INVENTOR.
O. L. GARRETSON
BY *Hudson & Young*
ATTORNEYS Patented Mar. 11, 1952

2,589,072

UNITED STATES PATENT OFFICE 2,589,072

RELIEF VALVE

Owen L. Garretson, Roswell, N. Mex., assignor to Phillips Petroleum Company, a corporation of Delaware Application September 20, 1948, Serial No. 50,105

6 Claims. (Cl. 137—53)

This invention relates to valves. In a more specific aspect, it relates to relief valves which are adapted to open when the gas pressure within a container rises above a predetermined value.

It is an object of the invention to provide an improved relief valve of the class described above.

Another object is to provide a relief valve having improved operation characteristics and reduced pressure range between the pressures causing initial leak, full opening, and resetting.

Another object is to provide a strong and simplified structure which is adapted for use with a plurality of types of coupling attachments, and which is rugged and foolproof in operation.

Various other objects, advantages and features of the invention will become apparent from the following detailed description taken in conjunction with the accompanying drawing, in which:

The figure is a vertical sectional view of the relief valve of this invention.

This application is a continuation of the copending application of O. L. Garretson, W. R. Eddy and T. A. St. Clair, Patent No. 2,479,737, filed February 25, 1946, entitled "Cylinder Filling and Dispensing Valves."

Referring now to the drawing in detail, I have shown a valve body 10 having threaded sections 11 and 12 at the respective ends thereof. The threaded section 11 is adapted to fit into a valve assembly of the type disclosed by the aforesaid Patent No. 2,479,737, and, when this connection is made, a bore 13 in the valve body communicates with a source of gas under pressure. Alternatively, the bore 13 may communicate with any other source of gas under pressure to which it is desired to attach the relief valve. The threaded section 12 is open to the atmosphere or, alternatively, it may be connected to a tank or other container in which the pressure is substantially lower than the pressure within the bore 13. As still another alternative, the threaded section 12 may be attached to a stack or other vent for relief gases.

The valve body 10 is shaped to form valve seat 15 which has a sharp annular edge 16 along the inner surface thereof. A valve head assembly 17 is slidably mounted within a bore 18 formed in the upper end of the valve seat body, and this assembly may include a generally cylindrical head member 19 having radially extending fins or ridges 20 which allow free passage of gas through the bore 18 when the valve is unseated. The head member 19 is internally threaded to receive a washer 21 which has an internally threaded opening for receiving a fusible plug 22. The plug 22 is an optional feature but is very advantageous where there is even a small chance that excessive temperatures may be encountered. If this occurs, the fusible metal melts and allows the gas within the bore 13 to escape, thereby preventing an explosion of the tank or other vessel communicating with the bore 13.

A spider 24 is screw threaded at the upper end of the threaded section 12 and this spider may be firmly secured within an interiorly threaded passage of the section 12 by a soldered connection 25. A compression spring 26 is fitted between a support 27 on the spider and the washer 21 on the valve head. This spring is of sufficient strength to prevent unseating of the valve head until the pressure differential between the bores 13 and 18 exceeds a predetermined value.

In accordance with the invention, a resilient washer or gasket 30 is fitted between a flanged portion 31 of washer 21 and a flanged portion 32 of head member 19. The washer 21 is also recessed, as indicated at 34, so that the gas within the bore 13 is admitted to the region or space between the resilient washer 30 and the recessed portion of washer 21. As a result, the pressure differential between recessed portion 34 and bore 18 forces the resilient washer 30 into engagement with the sharp ridge portion 16 of the valve seat.

The operation of the relief valve will now be apparent to those skilled in the art. Assuming that a pressure differential exists between bores 13 and 18, and that the valve is in its closed position, it will be apparent that the valve head assembly 17 is urged into engagement with the valve seat by the spring 26. As long as the pressure differential between the bores 13 and 18 does not exceed the predetermined value necessary to unseat the valve, the gas pressure in the recessed portion 34 forces resilient washer 30 against the ridge portion 16, thereby providing an effective sealing action which positively prevents the escape of gas from bore 13 into the bore 18. Higher pressures within bore 13 will provide an increased pressure differential with the result that the resilient washer will be pressed more firmly against the valve seat as the pressure increases. However, when the pressure differential becomes sufficient to overcome the force of spring 26, the valve head is abruptly unseated and gas is vented from bore 13 to the atmosphere or a low pressure container through bore 18. Accordingly, the valve is effectively sealed at all pressures up to the critical value at which unseating of the head assembly occurs, this sealing action becoming more and more effective as the pressure increases toward such predetermined value.

The following table is a comparison of the results obtained with the present valve and the results obtained when a solid washer is substituted for the washer 30, in a valve designed to open at a pressure of 375 pounds per square inch.

|  | With Annular Washer 30 | | With a Disc Substituted for Annular Washer 30 | |
| --- | --- | --- | --- | --- |
|  | New Valve | After 6 Months | New Valve | After 6 Months |
| Initial Leak | 375 | 381 | 390 | 450 |
| Full Opening | 381 | 389 | 410 | 485 |
| Reseat Minimum | 372 | 361 | 325 | 285 |

The figures represent pounds per square inch, and it is to be understood that the values in the foregoing table are average values of several groups of valves which were tested.

It will, therefore, be evident that the relief valve shown is an improvement over those of the prior art and is preferable for use with liquid petroleum gas because there is less leakage before the valve unseating pressure is reached and quicker closing of the valve when the pressure drops to a safe value. The range of pressure, from full opening to reseat, with the annular washer is only one tenth of that with the disc. The venting of an inflammable liquid petroleum gas is the lesser of two evils, the other evil being the bursting of the tank. Therefore, the less gas vented in order to keep the tank pressure at a safe value the more valuable the relief valve is for use with liquid petroleum gas equipment.

A further advantage of the relief valve resides in the fact that the pressure of spring 26 is directed against seat 15 through flanged portion 32 rather than through the gasket 30, thereby increasing the life of the gasket and insuring reliable operation of the valve. Also, the undercut seat portion 15 provides a gas restricting passage upon unseating of the valve which greatly improves the popping characteristics, and accurately guides the valve head to its original seated position upon closure of the valve. This, in turn, permits larger tolerances between adjacent parts of the valve head and body, thereby minimizing the tendency for the valve to stick in closed position.

While the invention has been described in connection with a present, preferred embodiment thereof, it is to be understood that this description is illustrative only and is not intended to limit the invention, the scope of which is defined by the appended claims.

I claim:

1. A relief valve comprising in combination a body having an inlet and an outlet, said body having a valve seat around said inlet, a raised edge on said valve seat, a valve head, means urging said valve head against said seat, a resilient washer mounted on said valve head to contact said raised edge and be deformed thereby, said head being recessed behind said washer at least as far as the interior of said raised edge, guide means guiding said head in said body, means to adjust the force of said urging means, said head contacting said seat to limit deformation of said washer by said raised edge, a conduit in said head communicating between said inlet and said outlet, a fusible plug closing said conduit and said recessed portion communicating with said inlet through said washer.

2. A relief valve comprising in combination a body having an inlet and an outlet, said body having a valve seat around said inlet, a raised edge on said valve seat, a valve head, means urging said valve head against said seat, a resilient washer mounted on said valve head to contact said raised edge and be deformed thereby, said head being recessed behind said washer at least as far as the interior of said raised edge, guide means guiding said head in said body, means to adjust the force of said urging means, a conduit in said head communicating between said inlet and said outlet, a fusible plug closing said conduit, and said recessed portion communicating with said inlet through said washer.

3. A relief valve comprising in combination a body having an inlet and an outlet, said body having a valve seat around said inlet, a raised edge on said valve seat, a valve head, means urging said valve head against said seat, a resilient washer mounted on said valve head to contact said raised edge and be deformed thereby, said head being recessed behind said washer at least as far as the interior of said raised edge, guide means guiding said head in said body, means to adjust the force of said urging means, said head contacting said seat to limit deformation of said washer by said raised edge, and said recessed portion communicating with said inlet through said washer.

4. A relief valve comprising in combination a body having an inlet and an outlet, said body having a valve seat around said inlet, a raised edge on said valve seat, a valve head, means urging said valve head against said seat, a resilient washer mounted on said valve head to contact said raised edge and be deformed thereby, said head being recessed behind said washer at least as far as the interior of said raised edge, guide means guiding said head in said body, means to adjust the force of said urging means, and said recessed portion communicating with said inlet through said washer.

5. A relief valve comprising, in combination, a hollow elongated valve body, an annular seat formed in said valve body having a longitudinally protruding ridge portion about its inner edge, a valve head mounted for longitudinal movement in said body, said head including a flanged portion engageable with said annular seat, a resilient sealing washer disposed within said flanged portion, an annular member for holding said washer in engagement with said flange, said member having a second ridge portion of larger diameter than the ridge portion on said seat, said member engaging said washer throughout the zone extending from the washer periphery to the region of engagement of said second ridge portion, said member being spaced from the washer throughout the zone extending from the region of engagement of said second ridge portion to the inner edge of said washer thereby to define an annular chamber between said member and said washer, said annular chamber communicating with said valve body through the opening in said washer, and a spring urging said valve head into engagement with said seat portion.

6. A relief valve comprising, in combination, a hollow elongated valve body, an annular seat formed in said valve body having a longitudinally protruding ridge portion about its inner edge, said seat dividing said valve body into an inlet conduit and an outlet conduit, a tubular valve head mounted for longitudinal movement in said body, said head being mounted in said outlet conduit and including a flanged portion engageable with said annular seat, a resilient sealing washer disposed within said flanged portion, an annular member threaded within said valve head to hold said washer in engagement with said flange, said member having a second ridge portion of larger diameter than the ridge portion on said seat, said member engaging said washer throughout the zone extending from the washer periphery to the region of engagement of said second ridge portion, and said member being spaced from the washer throughout the zone extending from the region of engagement of said second ridge portion to the inner edge of said washer thereby to define an annular chamber between said member and said washer, said annular chamber communicating with said inlet conduit through the opening in said washer, and a spring urging said valve head into engagement with said seat portion.

OWEN L. GARRETSON.

REFERENCES CITED

The following references are of record in the file of this patent:

UNITED STATES PATENTS

| Number | Name | Date |
|---|---|---|
| 763,208 | Robinson | June 21, 1904 |
| 964,468 | Guss | July 12, 1910 |
| 1,697,516 | Hale-Shaw | Jan. 1, 1929 |
| 2,072,271 | Meadows | Mar. 2, 1937 |
| 2,111,430 | Lamar | Mar. 15, 1938 |
| 2,200,124 | Sands | May 7, 1940 |

FOREIGN PATENTS

| Number | Country | Date |
|---|---|---|
| 12,911 | Great Britain | June 7, 1904 |